T. J. FARR.
Wagon-Brake.
No. 64,413.
2 Sheets—Sheet 2.
Patented May 7, 1867.
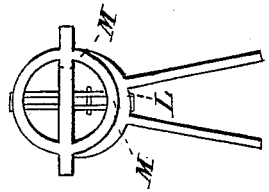
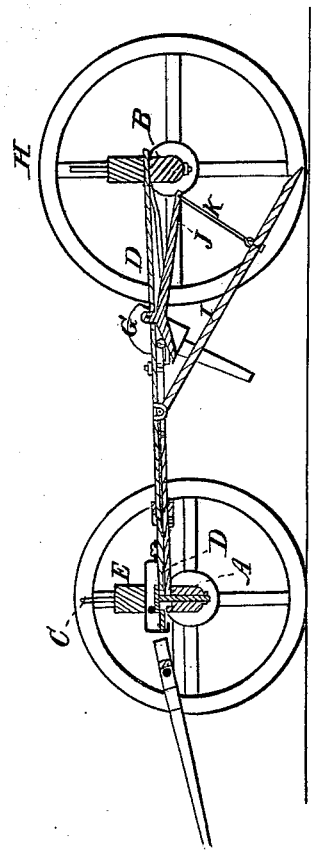
Witnesses:
Inventor:

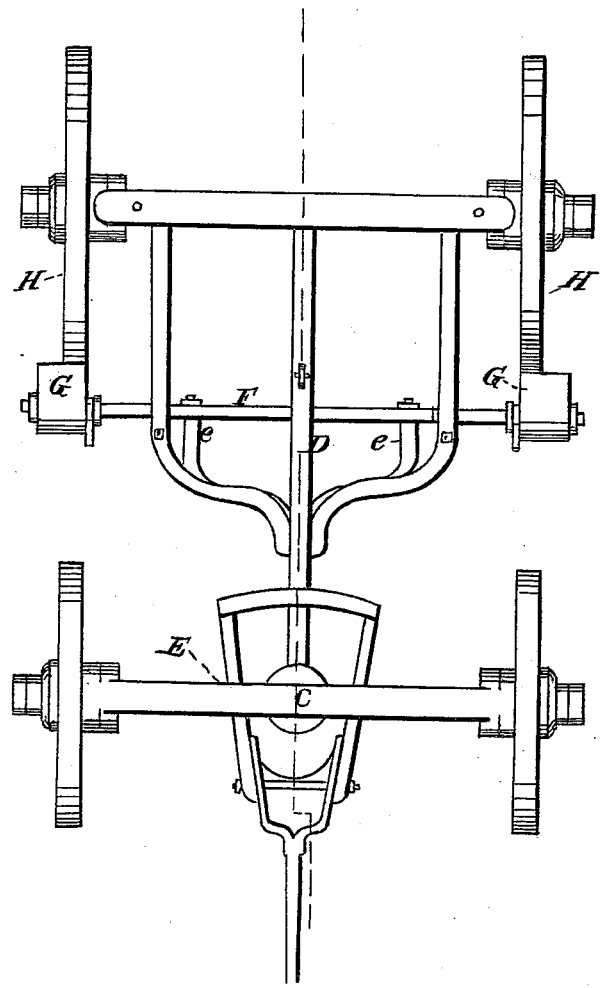

United States Patent Office.

T. J. FARR, OF MEDINA, OHIO.

Letters Patent No. 64,413, dated May 7, 1867.

IMPROVEMENT IN WAGON-BRAKE.

*The Schedule referred to in these Letters Patent and making part of the same.*

TO ALL WHOM IT MAY CONCERN:

Be it known that I, T. J. FARR, of Medina, of the county of Medina, and the State of Ohio, have invented new and useful Improvements in Wagon-Brake; and I do hereby declare the following to be a full, clear, and exact description of the same, sufficient to enable others skilled in the art to which it appertains to construct and use the same, reference being had to the accompanying drawings, which are made part of this specification, and in which the same letters indicate similar parts.

Figure 1 is a top or plan view.

Figure 2 is a longitudinal vertical section.

Figure 3 is a plan view of the device as modified to suit a buggy or carriage.

The forward end of the coupling slips forward on the king-bolts when the fore carriage is pushed to the rear by holding back on the tongue. At the same time a bar under the coupling-pole, and attached to the fore carriage, pushes against and rotates the brake-bar, bringing the rubbers against the wheel. In the drawings—

A is the fore axle, B the hind axle, C is the king-bolt, D is the coupling-pole, secured to the hind sand-board, and slipping by its slotted forward end upon the king-bolts when the tongue is pushed back as the horses hold back the wagon. The bar E is fastened above the fore axle and underneath the coupling-pole D. When the horses push back the thrust of the bar is communicated by the branches $e\ e$ to the brake-bar F, pushing the rubbers G G against the hind wheels H H, and raising the staff I by means of the lever J and cord K, the staff being shod with iron and intended to keep the wagon from running back when ascending a hill. As the horses pull upon the tongue the fore carriage slips forward on the coupling-pole, releasing the rubbers, and allowing the staff I to drop.

Figure 3 shows the modified form of my improvement as applied to the fifth-wheel of a buggy or carriage, in which the part L slips under the wheel M as before the slotted coupling-pole or reach before referred to.

Having described my invention, what I claim as new, and desire to secure by Letters Patent, is—

The arrangement of the slotted coupling-pole D, bar E, brake arrangement $e\ e$, G G, lever J, and staff I, substantially as described.

To the above specification of my improvement I have signed my hand this fifth day of March, 1867.

T. J. FARR.

Witnesses:
A. WASHBURN,
H. J. WALKER.